(12) United States Patent
Halliday et al.

(10) Patent No.: US 10,480,528 B2
(45) Date of Patent: Nov. 19, 2019

(54) SUPERPLASTIC FORMING

(71) Applicant: ROLLS-ROYCE plc, London (GB)

(72) Inventors: Robert Halliday, Derby (GB); Stephen J. Wilkinson, Derby (GB)

(73) Assignee: ROLLS-ROYCE plc, London (GB)

( * ) Notice: Subject to any disclaimer, the term of this patent is extended or adjusted under 35 U.S.C. 154(b) by 171 days.

(21) Appl. No.: 15/659,128

(22) Filed: Jul. 25, 2017

(65) Prior Publication Data
US 2018/0045217 A1   Feb. 15, 2018

(30) Foreign Application Priority Data

Aug. 10, 2016 (GB) .................................. 1613751.5

(51) Int. Cl.
*F04D 29/38* (2006.01)
*B21D 26/027* (2011.01)
(Continued)

(52) U.S. Cl.
CPC ......... *F04D 29/388* (2013.01); *B21D 26/027* (2013.01); *B21D 26/029* (2013.01);
(Continued)

(58) Field of Classification Search
None
See application file for complete search history.

(56) References Cited

U.S. PATENT DOCUMENTS

| 4,217,397 A | 8/1980 | Hayase et al. |
| 5,024,369 A | 6/1991 | Froes et al. |

(Continued)

FOREIGN PATENT DOCUMENTS

| EP | 0527564 A1 | 2/1993 |
| GB | 2261032 A | 5/1993 |

(Continued)

OTHER PUBLICATIONS

ATI, Jul. 20, 2012, http://www.atimetals.com/products/425-alloy/Pages/default.aspx.*
(Continued)

*Primary Examiner* — Justin D Seabe
*Assistant Examiner* — Jason A Fountain
(74) *Attorney, Agent, or Firm* — Oliff PLC

(57) ABSTRACT

An aerofoil structure with a hollow cavity is manufactured by diffusion bonding and superplastic forming. Outer panels are formed of a first material; a membrane is formed of a second material. Stop-off material is applied to preselected areas on at least one side of the membrane or of one of the panels so as to prevent diffusion bonding between the panels and the membrane at the preselected areas. The panels and the membrane are arranged in a stack and a diffusion bonding process is performed to bond together the first and second panels and the membrane to form an assembly. A superplastic forming process is performed at a forming temperature to expand the assembly to form the aerofoil structure. The forming temperature is selected so that the second material undergoes superplastic deformation at the forming temperature and the first material does not undergo superplastic deformation at the forming temperature.

7 Claims, 2 Drawing Sheets

(51) Int. Cl.
*B21D 26/029* (2011.01)
*B21D 26/059* (2011.01)
*B23P 15/02* (2006.01)
*F04D 29/02* (2006.01)

(52) U.S. Cl.
CPC ............ *B21D 26/059* (2013.01); *B23P 15/02* (2013.01); *F04D 29/023* (2013.01)

(56) References Cited

U.S. PATENT DOCUMENTS

| 8,162,202 | B2* | 4/2012 | Milburn | ............... | B21D 26/021 |
| | | | | | 228/234.1 |
| 9,694,438 | B2* | 7/2017 | Andrews | ................ | B23K 20/02 |
| 2012/0034091 | A1* | 2/2012 | Goldfinch | ............... | F01D 5/147 |
| | | | | | 416/227 R |

FOREIGN PATENT DOCUMENTS

| JP | H08-164488 A | 6/1996 |
| WO | 2007/058906 A1 | 5/2007 |

OTHER PUBLICATIONS

Dec. 22, 2017 Search Report issued in European Patent Application No. 17183016.
NPL. Cite 1.
For. cite EP1957216A1 which is cited in NPL cite 1.
Jan. 16, 2017 Search Report issued in British Patent Application No. 1613751.5.

* cited by examiner

SUPERPLASTIC FORMING

The present disclosure concerns superplastic forming of hollow structures, particularly (though not exclusively) superplastic forming of fan blades for gas turbine engines.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The propulsive fan 13 typically comprises a fan disc and a plurality of fan blades attached to the fan disc. This construction is known and will not be explained in further detail here.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

It is known to manufacture fan blades for a gas turbine engine such as that shown in FIG. 1 by superplastic forming and diffusion bonding metallic panels, the panels forming pressure and suction surfaces of the blade. These blades are generally referred to as wide-chord fan blades. The metallic panels may comprise elemental metal, metal alloys and metal matrix composites. In one known process for diffusion bonding and superplastic forming, the surfaces of the two panels to be joined are cleaned and at least one surface of one or both of the panels is coated, in preselected areas, with a stop-off material to prevent diffusion bonding. The panels are arranged in a stack and the edges of the panels are welded together, except where a pipe is welded to the panels, to form an assembly. The pipe enables a vacuum, or inert gas pressure, to be applied to the interior of the assembly. The assembly is placed in an autoclave and heated so as to "bake out" the binder from the material to prevent diffusion bonding. The assembly is evacuated, using the pipe, and the pipe is sealed. The sealed assembly is placed in a pressure vessel and is heated and pressed to diffusion bond the panels together to form an integral structure. Diffusion bonding occurs when two mating surfaces are pressed together under suitable temperature, time and pressure conditions; these conditions will be understood by the skilled reader and need not be discussed in detail here. The first pipe is removed and a second pipe is fitted to the diffusion bonded assembly at the position where the first pipe was located. The integral structure is located between appropriately shaped dies and is placed within a rig. The integral structure and dies are heated and pressurised fluid is supplied through the second pipe into the interior of the integral structure to cause the panels to be superplastically formed to produce an article matching the shape of the dies.

In addition to the hollow structure just described, it is also known to insert a membrane between the metallic panels prior to the above described process. The location of diffusion bonds between the membrane and the adjacent panels can be controlled by applying the stop-off material to preselected areas on each side of the membrane (or respective panels). When the aerofoil is subsequently expanded, at points where the membrane is attached to the outer panels this produces an internal structure.

Generally, the panels and the membrane (if used) are formed of the same or similar material; this simplifies the diffusion bonding process because the necessary temperature and pressure conditions are the same for all the layers. With similar materials, there is a known common beta transus temperature so the whole assembly can be heated to a diffusion bonding temperature that is a known number of degrees below that transus point; that known number of degrees will be the same for the panel and the membrane and so the diffusion bonding will occur consistently between them. Dissimilar materials will inevitably have different beta transus temperatures, and so a given diffusion bonding temperature will be further below one beta transus temperature than the other. Therefore, the membrane (in this case) or the panel will overheat and the material structure will be transformed into the beta phase. Therefore a diffusion bonding temperature must be selected that does not exceed the beta transus point of any of the materials involved. Also, when using similar materials the mechanical properties will be known and constant throughout the fan blade; whereas with dissimilar materials the mechanical properties will differ, making modelling and validation more complex.

It will be appreciated that the technique described above may be applied to other hollow components, not only to fan blades for gas turbine engines.

In known techniques, the temperature conditions applied during the superplastic forming process are such that both panels, or both panels and the membrane, will deform superplastically during the process, thereby forming the article matching the shape of the dies and (optionally) an internal structure by superplastic forming. Commonly, this is because the panels and the membrane are all formed from the same material, for example Ti-6Al-4V. This superplastic deformation of all the panels at once may result in undesired distortion. As shown in FIG. 2, this distortion is especially likely at the positions 30 where the membrane 32 has been diffusion bonded to one of the outer panels 34. This distortion gives rise to the characteristic "quilting" of the panel surface, which is detrimental to the aerodynamic performance of the fan blade or other component. To remove the quilting it is necessary to 'iron' the outer panels against the die surfaces at high forming pressures until the quilting is flattened out sufficiently. This typically doubles the duration of the superplastic forming process, thereby adding considerable cost.

It would therefore be desirable to be able to form hollow components by diffusion bonding and superplastic forming and to reduce or eliminate this "quilting" distortion.

According to a first aspect there is provided a method of manufacturing an aerofoil structure by diffusion bonding and superplastic forming to create a substantially hollow cavity within the aerofoil structure, the method comprising the steps of:

providing first and second outer panels formed of a first material;

providing a membrane formed of a second material;

applying stop-off material to preselected areas on at least one side of the membrane or of the first or second panel so as to prevent diffusion bonding between the panels and the membrane at the preselected areas;

arranging the first and second panels and the membrane in a stack so that the membrane is between the first and second panels;

performing a diffusion bonding process to bond together the first and second panels and the membrane to form an assembly;

performing a superplastic forming process at a forming temperature to expand the assembly to form an aerofoil structure with a hollow cavity;

the method characterised in that the forming temperature is selected so that the second material undergoes superplastic deformation at the forming temperature and the first material does not undergo superplastic deformation at the forming temperature.

The first material may undergo creep deformation at the forming temperature.

The superplastic temperature range of the first material may be higher than the superplastic temperature range of the second material.

The first material may be Ti-6Al-4V and the second material may be ATI-425®.

According to a second aspect there is provided an aerofoil structure formed by diffusion bonding and superplastic forming, the aerofoil structure comprising first and second outer panels formed of a first material and a membrane formed of a second material, characterised in that the second material has undergone superplastic deformation and the first material has not undergone superplastic deformation.

The superplastic temperature range of the first material may be higher than the superplastic temperature range of the second material.

The first material may have undergone creep deformation.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 3:
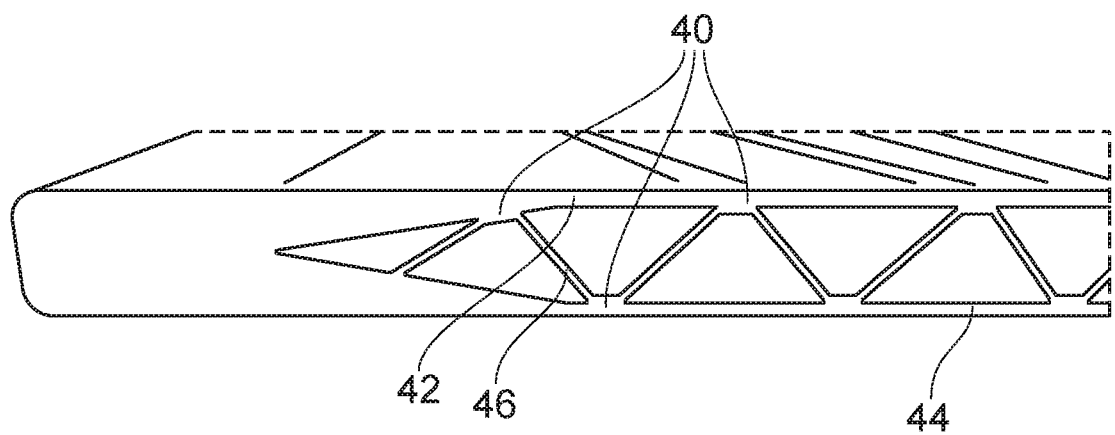
FIG. 3 is a schematic illustration of "quilting" distortion in a second diffusion bonded and superplastically formed component.

FIG. 3 shows a component formed by a diffusion bonding and superplastic forming process. As in known techniques, the component comprises a first outer panel 42 and a second outer panel 44, and a membrane 46. In known manner, the membrane 46 is inserted between the outer panels 42, 44 prior to the diffusion bonding process. The location of diffusion bonds between the membrane 46 and the outer panels 42, 44 can be controlled by applying the stop-off material to preselected areas on each side of the membrane (or respective panels). When the aerofoil is subsequently expanded, at points where the membrane is attached to the outer panels this produces an internal structure.

In contrast to known arrangements, in the arrangement of FIG. 3 the two outer panels 42, 44 are formed from a first material, for example Ti-6Al-4V, and the membrane 46 is formed from a second material, for example ATI-425®. ATI-425® has a lower superplastic temperature range than Ti-6Al-4V, and consequently it is possible to select a forming temperature for the superplastic forming process that will permit superplastic forming of the second material forming the membrane 46, while no superplastic forming will occur in the first material forming the outer panels 42, 44.

Figure 1:
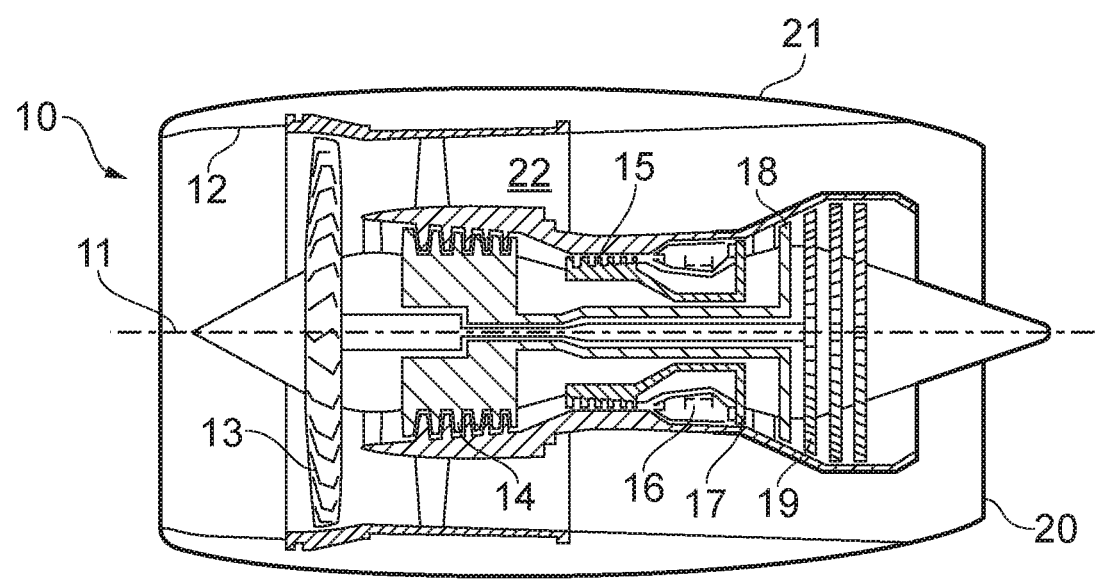
FIG. 1 is a sectional side view of a gas turbine engine, as already described.
Figure 2:
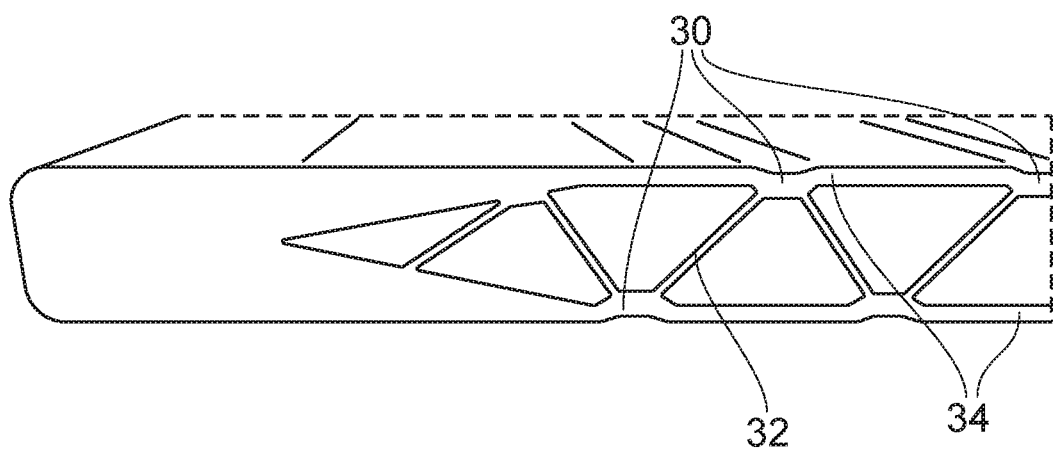
FIG. 2 is a schematic illustration of "quilting" distortion in a first diffusion bonded and superplastically formed component.

It is clear from FIG. 3 that the distortion at the positions 40 where the membrane 46 has been diffusion bonded to one of the outer panels 42, 44 is far less than in the equivalent places in FIG. 2, and the "quilting" is far less prominent. This is because at the selected forming temperature the membrane 46 will superplastically deform, while the outer panels 42, 44 will creep form to conform with the die surfaces but will not superplastically form.

Typically Ti-6Al-4V becomes superplastic at about 880° C. In the described method it may be combined with any other suitable alloy whose superplastic temperature range is lower than that of Ti-6Al-4V. A number of such alloys are known, with superplastic temperature ranges extending down to about 750° C. Two examples of suitable alloys are TIMETAL® 54M and VSMPO VST2, but of course there will be many others equally suitable. As will be apparent to the skilled reader, the general principle is that the material that is required to deform superplastically must have a lower superplastic temperature range than the material that is not required to deform superplastically.

It will be understood that the invention is not limited to the embodiments described above and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of manufacturing an aerofoil structure by diffusion bonding and superplastic forming to create a substantially hollow cavity within the aerofoil structure, the method comprising the steps of:

providing first and second outer panels formed of a first material;

providing a membrane formed of a second material;

applying stop-off material to preselected areas on at least one side of the membrane or of the first or second panel so as to prevent diffusion bonding between the panels and the membrane at the preselected areas;

arranging the first and second panels and the membrane in a stack so that the membrane is between the first and second panels;

performing a diffusion bonding process to bond together the first and second panels and the membrane to form an assembly;

performing a superplastic forming process at a forming temperature to expand the assembly to form the aerofoil structure with the hollow cavity;

the method characterised in that the forming temperature is selected so that the second material undergoes superplastic deformation at the forming temperature and the first material does not undergo superplastic deformation at the forming temperature.

2. The method of claim 1, in which the first material undergoes creep deformation at the forming temperature.

3. The method of claim 1, in which the superplastic temperature range of the first material is higher than the superplastic temperature range of the second material.

4. The method of claim 1, in which the first material is Ti-6Al-4V and the second material is titanium alloy grade 38.

5. An aerofoil structure formed by diffusion bonding and superplastic forming, the aerofoil structure comprising first and second outer panels formed of a first material and a membrane formed of a second material, characterised in that the second material has undergone superplastic deformation, the first material has not undergone superplastic deformation, and the first and second panels and the membrane are arranged in a stack so that the membrane is between the first and second panels.

6. The aerofoil structure of claim 5, in which the superplastic temperature range of the first material is higher than the superplastic temperature range of the second material.

7. The aerofoil structure of claim 5, in which the first material has undergone creep deformation.

* * * * *